United States Patent [19]

Comer et al.

[11] 3,962,482
[45] June 8, 1976

[54] CLEAR, ELASTIC, WATER GELS BASED ON CARRAGEENAN

[75] Inventors: Frederick W. Comer; Clifford H. G. Strong, both of Guelph, Canada

[73] Assignee: Uniroyal, Ltd., Canada

[22] Filed: June 2, 1975

[21] Appl. No.: 583,025

[30] Foreign Application Priority Data
Mar. 24, 1975  Canada.............................. 222872

[52] U.S. Cl. .............................................. 426/575
[51] Int. Cl.² ...................... A23L 1/04; A23L 1/06
[58] Field of Search ...................................... 426/575

[56] References Cited
UNITED STATES PATENTS

| | | | |
|---|---|---|---|
| 2,864,706 | 12/1958 | Staloff.................................. | 426/575 |
| 3,342,612 | 9/1967 | Foster et al.......................... | 426/575 |
| 3,445,243 | 5/1969 | Moirano.............................. | 426/575 |
| 3,502,483 | 3/1970 | Glicksman et al.................. | 426/575 |
| 3,556,810 | 1/1971 | Moirano.............................. | 426/575 |

FOREIGN PATENTS OR APPLICATIONS

| | | | |
|---|---|---|---|
| 870,000 | 5/1971 | Canada................................ | 426/575 |

*Primary Examiner*—Jeanette M. Hunter
*Attorney, Agent, or Firm*—Willard R. Sprowls

[57] ABSTRACT

Clear, elastic, water gels and gel-forming compositions are based on potassium-sensitive carrageenan in the form of an alkali metal or an ammonium salt and a water-soluble potassium salt. Addition to the composition of calcium-sensitive carrageenan, also in the form of an alkali metal or an ammonium salt, imparts freedom from syneresis. The water gels and the gel-forming compositions are characterized by essentially complete freedom from polyvalent metal cations.

12 Claims, No Drawings

CLEAR, ELASTIC, WATER GELS BASED ON CARRAGEENAN

BACKGROUND OF THE INVENTION

1. The Field of the Invention

The field of this invention is clear, elastic, edible, water gels based upon carrageenan as the principal gelling agent and, more particularly, such gels based on combinations of potassium salts with potassium-sensitive carrageenan or with potassium-sensitive carrageenan in combination with calcium-sensitive carrageenan which imparts freedom from weeping or syneresis. The invention resides in the gels themselves and in dry compositions, usually in granular or free-flowing particulate form, which form the gels when dissolved in water in appropriate amounts. The water gels and the gel-forming compositions of the invention are particularly characterized by essentially complete freedom from polyvalent metal cations. This means that these gels do not contain more than 0.01% or 100 ppm. by weight of polyvalent metal cations based on the total weight of carrageenan or carrageenans present and of the potassium salt.

2. Description of the Prior Art

The prior art includes the following references:

| United States Patents | | | |
|---|---|---|---|
| Frieden et al | 2,427,594 | Stancioff | 3,176,003 |
| Baker | 2,466,146 | Gordon, et al | 3,280,102 |
| Le Gloahec | 2,543,699 | Foster, et al | 3,342,612 |
| Le Gloahec | 2,556,282 | Moirano | 3,445,243 |
| Le Gloahec | 2,624,727 | Moirano | 3,556,810 |
| Stoloff | 2,864,706 | Stancioff et al | 3,562,176 |
| Campbell | 3,031,308 | Horn | 3,563,769 |
| Stanley | 3,094,517 | Klein et al | 3,658,556 |
| Canadian Patent | | | |
| Foster | 870,000 | | |

TECHNICAL LITERATURE REFERENCE

"Polysaccharide Gels-A Molecular View" by D. A. Rees, Chemistry and Industry, 19 Aug. 1972, pages 630 – 635.

In the above-cited U.S. patents, Baker in col. 1, lines 42-52, Stoloff, Campbell, Foster, and Moirano as well as the Rees article all indicate that only brittle, opaque, water gels are formed when potassium-sensitive carrageenan is used as the gelling agent. The Frieden patent is concerned with "complexes" of Irish Moss (*Chondrus crispus*) or the hot water extracted fraction thereof admixed with a potassium or ammonium salt as gelling agents of unspecified polyvalent metal ion content for use with substantially calcium-free food compositions. However, the Campbell patent states in column 1 that the Frieden et al. compositions yield stiff, brittle jelly-like masses that lack elasticity and resemble pectin gels.

The three Le Gloahec patents described techniques for exchanging cations in preparing one sodium gelose (carrageenate) for reaction with calcium alginate, another for a coarcervation reaction with gum arabic, and in preparing food thickening material by repeated and prolonged soaking treatments of seaweeds, including Irish Moss, in aqueous solutions of a potassium, sodium, calcium or magnesium salt. Stancioff U.S. Pat. No. 3,176,003 is concerned primarily with the selective extraction of lambda carrageenan by soaking sea plants, etc. in a solution of a salt and/or hydroxide of specified monavalent and polyvalent cations, whereby the kappa components remain undissolved. It is believed that the "commercial sodium carrageenate" which is subjected to aqueous KCl extraction in Example 13 would inherently contain a significant level of calcium ions.

Stancioff et al. U.S. Pat. No. 3,562,176 is concerned with a composition comprising (1) a marine plant polysaccharide, such as carrageenan, (2) a water-soluble compound of sodium or potassium which is a sequestrant for calcium, and (3) a water-soluble compound of calcium.

The Stanley patent is directed at the extraction of seaweed by digestion with aqueous alkaline media.

The Gordon patent relates to "equilibrating" carrageenan with a mixture of sodium and potassium ions, typically supplied by chlorides or hydroxides thereof; and the products would also contain calcium ions present in the Irish Moss and in lime used for extraction.

Foster U.S. Pat. No. 3,342,612 has gelling mixtures of a major proportion of a calcium-sensitive carrageenan and a minor proportion of a potassium-sensitive carrageenan from different sources and, preferably, also an ionizable compound of calcium or magnesium and a potassium compound.

Stoloff proposed improving the elasticity of carrageenan gels by sequestering the shortening ions therein (calcium, sodium, magnesium and ammonium) with a sufficient amount of a potassium salt of a sequestering agent.

Baker disclosed that a synergistic improvement in gel strength and elasticity was obtainable with a three-component mixture of a carrageenan material, locust bean gum and an edible salt, such as KCl; and this was confirmed by Moirano. The latter in U.S. Pat. No. 3,445,243 was concerned with further adding a calcium-sensitive carrageenan to that mixture to inhibit weeping of the gel, and calcium cations are preferably present also. Moirano U.S. Pat. No. 3,556,810 relates to similar gelling agents containing still another additive, calcium-reactive low methoxyl pectin for greater resistance to gradual hydrolysis and syneresis.

Horn has gels of high methoxy pectin in combination with carrageenan or eucheuman seaweed extract and cations of sodium, calcium or potassium.

The Klein patent is directed to a dessert with a gelling agent comprising potassium-sensitive carrageenan, calcium-sensitive carrageenan, potassium citrate and another potassium salt; and added calcium ions and locust bean gum are also included in the preferred agents.

The Foster Canadian patent discloses gel-forming agents containing adipic acid as an additive for tartness that consist essentially of calcium-sensitive carrageenan together with a calcium salt, and optionally blends thereof with a minor proportion of a potassium-sensitive carrageenan and a potassium salt.

While the foregoing disclosures contain some generalized remarks as to the elimination or substantial absence of polyvalent metal ions, (e.g., calcium ions) in gel-forming compositions or gels based on potassium-sensitive carrageenan, it is noteworthy that those statements are not accompanied by any supporting quantitative limits or data thereon nor by the disclosure of any methods that are believed to be capable of either the total exchange of calcium ions and the like for monovalent ions or the reduction of the concentration of such polyvalent ions to the low level specified herein for the compositions of the present invention.

Analyses of samples of six commercial sodium carrageenans and one commercial potassium carrageenan available in the U.S.A. or in Europe showed calcium ion contents ranging from 0.043 to 0.430% and averaging 0.134%. All of those contents are much greater than the maximum set forth as permissible for the instant invention. Moreover, none of those commercial products yielded a clear and elastic water gel upon testing.

SUMMARY OF THE INVENTION

The present invention relates to clear, elastic water gels based upon carrageenans as the principal gelling agents in the presence of added potassium ions. The clear, elastic gels can be made from a composition of potassium-sensitive carrageenan in the form of an alkali metal or ammonium salt together with a non-toxic, water-soluble potassium salt. A further embodiment of the present invention comprises the use of calcium-sensitive carrageenan in addition to the potassium-sensitive carrageenan, both carrageenans being in the form of alkali metal or ammonium salts, and a non-toxic, water-soluble potassium salt whereby the clear, elastic water gel is rendered non-weeping. The invention resides in the gels themselves and in dry compositions, usually in granular or free-flowing particulate form, which when dissolved in water in appropriate amounts form the gels. The water gels and the gel-forming compositions of the invention are particularly characterized by essentially complete freedom from polyvalent metal cations.

Other aspects of the invention are concerned with preferred or special embodiments including the selection of the carrageenan or carrageenans to be used in the gelling agent composition, the monovalent cation of the carrageenan salt, the water-soluble potassium salt and the proportions of components in the gelling agent composition.

More specifically, a clear, elastic, water gel may be made by utilizing a composition comprising potassium-sensitive carrageenan in the form of an alkali metal or an ammonium salt and a non-toxic, water-soluble potassium salt other than potassium carrageenate in an amount equal to from about 10 to 110% by weight based on the weight of said potassium-sensitive carrageenan. The above composition may also include calcium-sensitive carrageenan in the form of an alkali metal or an ammonium salt, in an amount equal to from about 30 to 155% by weight based on the weight of said potassium-sensitive carrageenan. The water gels and the gel-forming compositions of the invention are free of polyvalent metal cations in amount more than about 0.01% by weight based on the total weight of carrageenan or carrageenans present and said potassium salt. The preferred alkali metal salt of the carrageenan is potassium carrageenate. The preferred non-toxic, water-soluble potassium salt is potassium citrate. Particularly preferred dessert gels of the invention are based on compositions comprising the potassium salt of potassium-sensitive carrageenan, the potassium salt of calcium-sensitive carrageenan and potassium citrate.

Numerous objects, advantages and benefits of this invention will be readily apparent to those skilled in the art upon consideration of the detailed disclosure hereinafter.

DESCRIPTION OF SPECIFIC EMBODIMENTS

This invention is concerned with edible dessert gels and gelling agents therefor. In particular it relates to the development of clear, elastic, water gels using carrageenans as gelling agents in the presence of potassium ions. These gelling agents are produced from extracts of seaweeds of the class Rhodophyceae, e.g. *Chondrus crispus*, *Eucheuma cotonii*, *E. striata*, *Gigartina stellata*, *G. radula*, which contain the sulfated galactan, kappa carrageenan. These extracts have been previously described in the literature as potassium-sensitive carrageenans since their gelling properties are greatly enhanced by the presence of added potassium ions.

The gelling agents of this invention may also be produced by combining the above mentioned extracts with extracts of other seaweeds of the class Rhodophyceae, e.g. *Eucheuma spinosum*, *Agardhiella tenera*, which contain another sulfated galactan, iota carrageenan. In the literature, iota-carrageenan has been described as calcium-sensitive carrageenan since its gelling properties are enhanced by the presence of added calcium ions.

Extracts of seaweeds containing potassium-sensitive carrageenan may exhibit wide variations in their water gel strength properties. These occur because the carrageenan extracted is composed of a gelling kappa fraction and a non-gelling lambda fraction. The proportions of these two components can vary widely within a single species of seaweed. For example, products have been obtained from *Chondrus crispus* having kappa/lambda ratios as high as 7/1 and as low as 0.5/1 by weight. In the preparation of dessert gels it is preferable to employ a high water gel strength carrageenan, and for the purposes of illustration of this invention a high water gel strength carrageenan with a kappa/lambda ratio of 2.5/1 has been used. However, it is to be understood, that even though the lambda component does not contribute to the gelling properties, extracts containing less of the kappa component are adequate when used at higher concentrations to compensate for their lower percent kappa content.

The gelling properties of carrageenans are improved if weak alkaline conditions are used for their extraction from seaweed. Hence for the purposes of illustration of this invention, the potassium-sensitive carrageenans used were extracted from seaweed sources by means of hot aqueous lime solutions as described in Example 1 hereinafter. (See also Example 3 of Canadian application Ser. No. 162,894, filed Feb. 5, 1973). The calcium-sensitive carrageenan was extracted in the same manner as the potassium-sensitive carrageenan.

Carrageenans typically contain 20–40% by weight of sulfate groups which in the seaweed are neutralized by a mixture of calcium, potassium, sodium and magnesium cations. During extraction these cations are freely exchangeable and hence extractions using lime yield products in which the predominant cation is calcium. These products are referred to herein as calcium carrageenates.

Formation of the carrageenan components of this invention involves the virtually complete exchange of all polyvalent metal cations, e.g. calcium, magnesium, with monovalent cations, especially alkali metal cations such as potassium and sodium, or ammonium.

The predominant cation of the carrageenans may be readily altered by the addition of salts but this exchange may be incomplete. For example, when 20 g. calcium carrageenate, dissolved in 1 liter of a 2% sodium chloride solution in water, is recovered by precipitation with isopropyl alcohol, a partially exchanged sodium carrageenate is obtained which still contains 0.5% calcium (Table I hereinafter). This product will be referred to herein as partial sodium carrageenate. If, however, alkali metal carbonate (e.g. sodium carbonate) solutions are added to calcium carrageenate solutions, then calcium carbonate precipitates and the cation exchange becomes essentially complete, as is shown by the fact that the eventual sodium carrageenate product contains less than 0.01% calcium (TABLE I). The calcium carbonate is removed by filtration; thereafter the filtrate is neutralized with hydrochloric or another suitable acid, and the sodium carrageenate product, essentially free from calcium, may then be recovered from solution in the filtrate by alcohol precipitation. Alternatively, prior to alcohol precipitation, the carrageenan solution may be concentrated and purified, by means of ultrafiltration as described in Example 2 hereinafter (see also Example V of Canadian application Ser. No. 149,534, filed Aug. 16, 1972). These two recovery procedures give virtually identical sodium carrageenate products. The products referred to herein as sodium and potassium carrageenates were prepared in such manner.

TABLE I

Calcium Content of Carrageenans

| Sample | Calcium content % by weight |
|---|---|
| Calcium carrageenate | 3.4 |
| Partial sodium carrageenate | 0.5 |
| Sodium carrageenate | <0.01 |

As indicated in TABLE I, calcium carrageenate itself was analyzed and found to contain 3.4% calcium or 34,000 parts per million. TABLE I also shows that in preparing sodium carrageenate for use in practising the present invention, the calcium content is typically reduced to less than 0.01% calcium or 100 parts per million. The same reduction is typically achieved with potassium or ammonium carrageenates used as components of the compositions of the present invention. The values given herein for polyvalent cation content of the various carrageenans were measured by atomic absorption spectroscopy.

As stated previously, the presence of potassium cations is essential as a component of the gelling agent compositions of the present invention. It is to be understood that any non-toxic, water-soluble potassium salt may serve as a source of potassium cations to enhance the gel strength properties. A substantial amount of potassium is present in the potassium-sensitive carrageenan when that carrageenan is present in the form of potassium carrageenate, but this is of course not true when the carrageenan occurs in the form of sodium or ammonium carrageenate. However, greater gel strength properties are provided by the addition to the carrageenan of a non-toxic, water-soluble potassium salt selected from the group consisting of potassium citrate, acetate, chloride, carbonate, bicarbonate, sulfate, bitartrate and phosphate. The potassium salt used in the gelling agent composition is preferably potassium citrate, since the citrate ion is a buffering agent. If the potassium cations are furnished by a potassium salt other than potassium citrate, then some other buffering agent may be employed, such as sodium citrate. Of course, both potassium carrageenate and an added potassium salt, other than potassium carrageenate, may be components of the present compositions.

In addition to a gelling agent, water dessert gel compositions, made in accordance with this invention, generally include a sweetening agent, e.g. sugar, and an organic acid, e.g. citric, adipic or malic acid, to provide a tart flavor. The dessert gels used for the purposes of illustration herein were prepared using 14% sugar and 0.45% adipic acid. Since these additives do not influence significantly the gelling properties of carrageenans, it is to be understood that their exact proportions and nature are subject to considerable variation and many modifications in the practice of this invention.

This invention is concerned directly with the nature and composition of the gelling agent, and specifically it relates to the use of potassium-sensitive or mixtures of potassium-sensitive and calcium-sensitive carrageenans, together with a non-toxic, water-soluble potassium salt, in water dessert gels where the polyvalent metal cation content is not more than 0.01% by weight based on the combined contents of carrageenan material and the potassium salt. The present compositions employ carrageenan products in which the cations are monovalent, especially alkali metal cations such as potassium and sodium,, or ammonium, as well as mixtures of these monovalent cations. The good gel strength properties and other advantages of this invention may be realized within the broad ranges of gelling agent component concentrations indicated in TABLE II.

TABLE II

Gelling Agent Components

| Component | % by weight of water gel |
|---|---|
| A) Potassium-sensitive carrageenan | 0.1 – 3 |
| B) Calcium-sensitive carrageenan | 0.1 – 3 |
| C) Potassium salt | 0.1 – 1 |

Components A and C are essential constituents of all of the present gelling agents, and optional component B is also included in certain embodiments of these compositions for enhancing some of their properties.

In the practice of this invention, the carrageenan and potassium salt components of the gelling agent can be combined in many different proportions to produce desirable water dessert gels. Potassium-sensitive carrageenan forms weak water gels at about 2% concentration. However, in the presence of added potassium ions, very strong gels are produced. The gel strength enhancing effect of increasing additions of potassium ions increases rapidly until approximately equal amounts by weight of potassium salt (e.g., potassium citrate) and carrageenan are present. In actual practice, the amount of added potassium salt may be limited in at least some instances due to its effect on the taste of the gel. The minimum quantity of potassium-sensitive carrageenan necessary for gel formation is about 0.2% in the presence of 0.2% potassium citrate based on the total weight of gel.

The prior art strongly stated that only brittle, opaque water gels could be formed using potassium-sensitive carrageenan as the gelling agent in the presence of potassium ions. When the calcium form of potassium-sensitive carrageenan is used, cloudy, brittle gels are indeed produced which readily fracture (low shear strength) and also exhibit syneresis. However, we have discovered that when a virtually completely exchanged monovalent form, e.g. sodium, potassium, or ammonium carrageenate is used, clear elastic gels are produced which exhibit higher shear strengths and a reduced tendency to weep. Partially exchanged forms of carrageenan produce gels that cannot match the clarity of the present gels and sometimes display a substantially greater water loss.

Calcium-sensitive carrageenan forms weak gels at about 2% concentration. The gel strength is only slightly enhanced by added potassium ions but is moderately enhanced by added calcium ions. Thus in dessert gels in which calcium-sensitive carrageenan contributes significantly to the gel strength properties, it has heretofore been customary to add about 0.05% calcium sulfate. The calcium form of calcium-sensitive carrageenan produces weak, elastic gels which are hazy but which do not exhibit syneresis. We have discovered that the haze or cloudiness is due to the presence of calcium ions; and when an essentially completely exchanged monovalent form, e.g. sodium, potassium or ammonium carrageenate is used in the absence of added calcium ions, weak, clear, elastic gels are produced which do not exhibit syneresis.

In this invention, a combination of potassium-sensitive carrageenan in monovalent cation form and a potassium salt provides the gel strength necessary to impart good unmolding and shape-retaining properties to dessert gels with the desired clarity and elasticity properties. However, it is often advantageous to include a calcium-sensitive carrageenan (also in the form of the monovalent cation) in the formulation for the primary purpose of eliminating syneresis (water loss). When unmolding and shape-retaining properties are not required, the calcium-sensitive carrageenan may be the major carrageenan component present.

We have found that when a high gel strength (kappa/lambda ratio of 2.5/1), potassium-sensitive carrageenan, which is in the substantially completely exchanged monovalent form, is used together with a calcium-sensitive carrageenan, which also is in the essentially completely exchanged monovalent form, and potassium citrate, clear, elastic, non-weeping dessert gels with excellent unmoulding and shape-retaining properties are produced within the limits of gelling agent components shown in TABLE III.

TABLE III

Preferred Gelling Agent Components

| Component | % by weight of water gel |
|---|---|
| A) Potassium-sensitive carrageenan | 0.2 – 0.8 |
| B) Calcium-sensitive carrageenan | 0.2 – 1.2 |
| C) Potassium citrate | 0.1 – 0.4 |

EXAMPLES

For a better understanding of the nature, objects and advantages of this invention, reference should be had to the following examples and tabulations thereof. Examples 1 and 2 are concerned with the preliminary preparation of carrageenan compounds; Examples, 6, 7, 10, 11 and 12 are comparative examples, and Examples 3, 4, 5, 8, 9 and 13 to 26, inclusive, illustrate some compositions of the present invention and the gels obtainable therewith. The latter group of examples is illustrative of this invention and not intended as limitations thereon. All proportions are set forth in terms of weight unless otherwise indicated herein and all temperatures are expressed as degrees Centigrade.

EXAMPLE 1

This example illustrates the preparation of a high water gel strength potassium-sensitive carrageenan.

One hundred g. of dry whole *Chondrus crispus* plants were pretreated for 15 minutes with 2 liters (l.) of 0.2% (by weight) nitric acid at approximately 15° C. The solution was decanted, and fresh cold water was added. The seaweed was allowed to soak for 5 minutes, drained, then given a further 5 minute soak in fresh cold water, and drained.

The pretreated wet seaweed was transferred to a 1-l. reaction kettle and boiling water was added to provide a total liquid volume of just under one l. The mixture was heated to approximately 90° in about ½ hour, by which time, the seaweed had completely broken down into a highly viscous mass. Calcium hydroxide (20 g.) was added and mixed into the hot seaweed mixture, the temperature was raised to 95°–98° and maintained for 18 hours. The seaweed concentration in the mixture subjected to digestion was about 10%. The cooked seaweed slurry was diluted to approximately 2.5 l. 1. then filter aid was added, and the mixture filtered. The dry filter cake was washed with a small quantity of hot water and the extracted, lime-modified carrageenan product was recovered from solution, after neutralization with hydrochloric acid to pH 7, by alcohol precipitation and drying. The aqueous gel strength of the product was 1330 g. as determined in the manner detailed in Canadian application Ser. No. 162,894, filed Feb. 5, 1973.

In producing essentially calcium-free carrageenan material suitable for components of the present compositions, the foregoing procedure was altered prior to the neutralization with HCl to provide for virtually complete exchange of calcium and any other polyvalent metal cations in the carrageenan extract solution with potassium or sodium ions. Such ion exchange was effected as described hereinbefore by treatment of the extract solution with potassium or sodium carbonate, filtration of the resulting precipitate prior to neutralization of the filtrate with hydrochloric acid, and thereafter recovering the carrageenan material in monovalent ion form from the filtrate by precipitation with isopropyl alcohol.

EXAMPLE 2

This example illustrates methods of preparation of ion-exchanged potassium, ammonium and sodium carrageenates of utility in this invention (Portions B, C and D).

A quantity of *Chondrus crispus* was extracted similarly to the procedure of Example 1 in the presence of calcium hydroxide, to give just over 10 l. of filtered, neutralized (to pH 8 to 8.5), carrageenan extract solution containing approximately 2 percent of the polysaccharide. This solution was divided into four portions A, B, C and D of 2.5 l. each for treatment as follows.

Portion A

This portion was ultrafiltered, as described in Canadian application Ser. No. 149,534 filed Aug. 16, 1972 using a 40-inch tubular ultrafiltration module, fitted with P.M. 30 ultrafiltration membrane. The ultrafiltration was continued until the volume of the original solution had been reduced by 50 percent, i.e., 1.25 l. of ultrafiltrate had been collected. Flux rates were determined for various increases in the quantity of ultrafiltrate collected. The ultrafiltration apparatus was flushed with hot water. The washings, together with a fine filter aid, were added to the concentrated carrageenan solution, and the hot solution filtered. The ultrafiltered carrageenan solution exhibited a distinct improvement in color. Carrageenan (calcium carrageenate) was recovered from the filtrate by alcohol precipitation, washing in alcohol and drying. No carrageenan was detected in the ultrafiltrate on alcohol addition.

Portion B

This portion was treated as closely as possible, and in the same manner, as for Portion A, except that after the flux rate determination at the start of the experiment, 2-g. portions of potassium carbonate were added with determination of flux rate until there was no change in flux rate on further addition of the carbonate. During the carbonate addition period, there was complete recirculation of carrageenan solution, and ultrafiltrate to the solution reservoir. At the end of the carbonate addition period, the carrageenan solution was treated as Portion A, i.e., 1.25 l. ultrafiltrate was collected, the solution filtered to remove the precipitate of calcium carbonate, and the potassium carrageenate was recovered by alcohol precipitation.

Portion C

This portion was treated in the same manner as Portion B, except that ammonium carbonate was substituted for potassium carbonate. Ammonium carrageenate was recovered, as in the previous cases, by alcohol precipitation.

Portion D

This portion was treated similarly to Portion B, except that in this case sodium carbonate was used in place of potassium carbonate. Sodium carrageenate was recovered, like the products in the previous cases, by alcohol precipitation.

Each of the carrageenan samples used in illustrative Examples 3, 4, 5, 8, 9 and 13 through 26, inclusive, in the Tables hereinafter had been ion exchanged so as to reduce its polyvalent metal cation content to less than 0.01% by weight (100 parts per million). The partial sodium and partial ammonium carrageenan samples used in comparative Examples 7 and 10 respectively, had their polyvalent metal cation contents reduced to between about 0.3 and 0.9%. Calcium carrageenans were employed in comparative Examples 6, 11 and 12.

Each of the water gels of Examples 3, 4, and 5, TABLE IV, was prepared by adding a mixture of the appropriate carrageenan and potassium chloride to 150 ml. hot water with vigorous mechanical stirring. Heating and stirring were continued for about 10 minutes and the solution diluted to 200 g. with hot water. The hot solutions were poured into 6-oz. fruit juice glasses which were then placed in the refrigerator for overnight cooling at 5°. The resulting water gels were unmolded and examined visually for clarity and elasticity.

Each of the dessert gels of Examples 6–26, TABLES V, VI and VII, was prepared in an analogous manner, i.e. a solution of 28 g. sugar in 150 ml. water was heated to 90°. A mixture of the carrageenan sample or samples, potassium citrate and adipic acid (0.9 g.) was added slowly to the sugar solution with vigorous mechanical stirring. Heating and stirring were continued for about 10 minutes and the solutions were diluted to 200 g. with hot water. The hot solutions were poured into 6-oz. fruit juice glasses whose rims had been extended with masking tape and the glasses then placed in the refrigerator (5°) overnight.

The dessert gels were evaluated for clarity, water loss and elasticity. Relative clarity and water loss were estimated visually. Transparent gels were designated as clear, and lack of clarity (degree of cloudiness) represented by 1 to 3 minus signs (−), with —— indicating opaque gels. Negligible water loss was designated as nil, and the extent of any syneresis represented by 1 or more + signs with +++ denoting considerable weeping (several ml.). The extent of water loss was estimated after the dessert gels had warmed to room temperature.

While it was possible to estimate the elasticity or degree of rigidity in an analogous manner by simply touching the gels, a more quantitative measure of elasticity was obtained in most examples by a determination of the sag of the unmolded gel. To determine the sag, the gels were removed at 5°C. from the refrigerator, the masking tape was removed and the gel sliced level with the top of the glass and the gel unmolded by inverting the glass. The inner dimensions of the fruit juice glass were 7.8 cm. high × 6.1 cm. top diameter × 4.0 cm. bottom diameter. The sag was determined immediately and was recorded as the percentage decrease in gel height. Dessert gels possessing desirable elasticities were obtained with sags of 14–40%.

An alternative measure of elasticity was employed in many examples involving gel strength determinations obtained with the FIRA (Food Industrial Research Association) jelly tester. The unmolded gels from the sag determination were transferred to 300 ml. beakers and remelted in a hot water bath. The solutions were then poured into 2-inch Plexiglass$^{(R)}$ cubes and set in the refrigerator overnight. Immediately after removing the gels from the refrigerator, the gel strengths were determined as follows: A small spade 2 × 2 cm. is inserted in the gel and rotated. The gel strength is the force in grams necessary to break the gel. Also recorded were the degrees of rotation required to break the gel and the speed at which the gels broke fast (F) or slow (S). Elastic gels are characterized by a slow break at high angles of rotation.

TABLE IV

Water Gels Using Potassium-Sensitive Carrageenan

| Example | Potassium-sensitive carrageenan | | KCL % | Total % Gelling Agent | Clarity | Elasticity |
|---|---|---|---|---|---|---|
| | Cation present in carrageenan | % carrageenan used in gel | | | | |
| 3 | Na | 0.8 | 0.2 | 1.0 | Clear | comparable with a gelatin gel |
| 4 | K | 0.75 | 0.2 | 0.95 | Clear | stiffer than a gelatin gel |

TABLE IV-continued

Water Gels Using Potassium-Sensitive Carrageenan

| Example | Potassium-sensitive carrageenan | | KCL % | Total % Gelling Agent | Clarity | Elasticity |
|---|---|---|---|---|---|---|
| | Cation present in carrageenan | % carrageenan used in gel | | | | |
| 5 | K | 0.6 | 0.2 | 0.8 | Clear | comparable with a gelatin gel |

TABLE V

Dessert Gels Using Potassium-Sensitive Carrageenans

| Example | Cation present in carrageenan | % by wt. of carrageenan | Potassium citrate % | Total % Gelling Agent | Clarity | Water Loss | Sag % | FIRA TEST | | |
|---|---|---|---|---|---|---|---|---|---|---|
| | | | | | | | | Gel Strength g | Rotation at break | Break speed |
| 6 | Ca | 0.8 | 0.15 | 0.95 | — | G2zzz | 0 | 65 | 15° | F |
| 7 | Partial Na | 0.8 | 0.15 | 0.95 | — | +++ | 21 | nd* | | |
| 8 | Na | 0.8 | 0.15 | 0.95 | Clear | ++ | 18 | 25 | 30° | S |
| 9 | K | 0.8 | 0.15 | 0.95 | Clear | ++ | 14 | 80 | 40° | S |
| 10 | Partial NH$_4$ | 0.8 | 0.15 | 0.95 | — | ++ | 14 | nd* | | |

*nd = not determined

TABLE VI

Dessert Gels

| Example | Potassium-sensitive carrageenan | | Calcium-sensitive carrageenan | | Potassium citrate % | Total % Gelling agent | Clarity | Water Loss | Sag % | FIRA TEST | | |
|---|---|---|---|---|---|---|---|---|---|---|---|---|
| | Cation present | % by wt. of carrageenan | Cation present | % by wt. of carrageenan | | | | | | Gel Strength g | Rotation at break | Break speed |
| 11 | Ca | 0.6 | — | — | 0.15 | 0.75 | — | +++ | 3 | 33 | 15° | F |
| 12 | Ca | 0.15 | Ca | 0.6 | 0.2 | 1.00+ | — | Nil | 24 | 25 | 40° | S |
| 13 | Na | 0.6 | — | — | 0.15 | 0.75 | Clear | ++ | 30 | nd* | | |
| 14 | Na | 0.6 | Na | 0.2 | 0.15 | 0.95 | Clear | Nil | 30 | nd* | | |
| 15 | Na | 0.6 | Na | 0.4 | 0.15 | 1.15 | Clear | Nil | 25 | 15 | 40° | S |
| 16 | K | 0.6 | — | — | 0.15 | 0.75 | Clear | ++ | 18 | 28 | 30° | S |
| 17 | K | 0.6 | K | 0.4 | 0.15 | 1.15 | Clear | Nil | 25 | 28 | 30° | S |
| 18 | K | 0.6 | Na | 0.4 | 0.15 | 1.15 | Clear | Nil | 21 | 20 | 20° | S |

+ includes 0.05% Calcium sulfate
*nd = not determined

TABLE VII

Dessert Gels Using Potassium Carrageenates

| Example | Potassium-sensitive carrageenan % | Calcium-sensitive carrageenan % | Potassium citrate % | Total % Gelling Agent | Clarity | Water Loss | Sag % | FIRA TEST | | |
|---|---|---|---|---|---|---|---|---|---|---|
| | | | | | | | | Gel Strength g | Rotation at break | Break speed |
| 19 | 0.28 | 0.28 | 0.24 | 0.80 | Clear | Nil | 32 | 19 | 55° | C |
| 20 | 0.22 | 0.34 | 0.24 | 0.80 | Clear | Nil | 39 | 15 | 65° | S |
| 21 | 0.40 | 0.26 | 0.16 | 0.80 | Clear | Nil | 30 | 30 | 65° | S |
| 22 | 0.40 | 0.40 | 0.20 | 1.00 | Clear | Nil | 25 | 30 | 50° | S |
| 23 | 0.35 | 0.35 | 0.30 | 1.00 | Clear | Nil | 22 | 50 | 68° | S |
| 24 | 0.65 | 0.43 | 0.12 | 1.2 | Clear | Nil | 17 | 65 | 42° | S |
| 25 | 0.48 | 0.48 | 0.24 | 1.2 | Clear | Nil | 16 | 27 | 32° | S |
| 26 | 0.34 | 0.50 | 0.36 | 1.2 | Clear | Nil | 20 | 45 | 68° | s |

The advantageous properties of the dessert gel of this invention are clearly demonstrated by the examples listed hereinbefore in TABLES IV, V, VI and VII.

The simple water gels illustrated in Examples 3–5 in TABLE IV, show that potassium-sensitive carrageenan, in the presence of added potassium chloride, produced clear, elastic gels comparable with gelatin gels. Both the sodium and potassium forms of carrageenan, wherein the polyvalent metal cation content had been reduced to less than 0.01% by weight, exhibited this novel and unexpected result.

Examples 6–10 in TABLE V show that clear, elastic dessert gels are produced, using potassium-sensitive carrageenan and potassium citrate, if the calcium ions are exchanged with monovalent ions. In the examples reported in TABLE V, the highest clarity was achieved in illustrative Examples 8 and 9 using carrageenans of essentially negligible calcium content.

Examples 12, 14, 15, 17, 18 in TABLE VI, with complete correlation, show that water loss is eliminated by incorporating calcium-sensitive carrageenan in the formulation. The gels of illustrative Examples 14, 15, 17, 18 were considerably more desirable than that of comparative Example 12 on the basis of clarity. In comparative Example 12, the composition contained 0.05% of added calcium sulfate as well as the calcium content arising from the utilization of the calcium form of the carrageenans.

The preferred monovalent cation of this invention is potassium. On the basis of clarity, water loss and elasticity measurements, sodium and potassium carrageenate dessert gels are comparable as shown in Examples 15, 17 and 18. However, the potassium carrageenate gels exhibited a higher shear strength, i.e. a lesser tendency to fracture when handled. The predominantly potassium carrageenate dessert gels of Examples 16, 17 and 18 could be rolled end-over-end without splitting whereas the sodium carrageenate dessert gels of Examples 13, 14 and 15 split when treated in this manner.

Illustrative Examples 19–26 in TABLE VII show that the preferred dessert gels of this invention can be produced using varying amounts and proportions of the three components of the gelling agent, viz. the potassium form of potassium-sensitive carrageenan, carrageenan the potassium form of calcium-sensitive carrageenan and potassium citrate.

While the present compositions have been illustrated by a limited number of detailed examples for purposes of valid comparison, it will be apparent to those skilled in the art that many other variations and modifications are within the purview of the invention, such as other proportions, other potassium salts and incorporating compatible additives, including coloring materials, flavoring agents. etc. Accordingly, this invention should not be construed as limited in any particulars, except as set forth in the appended claims or required by the prior art.

The embodiments of the invention in which an exclusive property or privilege is claimed are defined as follows:

1. A composition, soluble in water to produce a clear, elastic, water gel, comprising potassium-sensitive carrageenan in the form of an alkali metal or an ammonium salt, a non-toxic, water-soluble potassium salt other than potassium carrageenate in an amount equal to from about 10 to 110% by weight based on the weight of said potassium-sensitive carrageenan, said composition being free of polyvalent metal cations in amount more than about 0.01% by weight based on the combined weights of carrageenan or carrageenans present and said potassium salt.

2. A composition as set forth in claim 1 which also comprises a sweetening agent, and a free organic acid to impart a tart flavor.

3. A composition as set forth in claim 1 wherein said potassium salt is potassium citrate.

4. A composition, soluble in water to produce a clear, elastic, non-weeping, water gel, comprising potassium-sensitive carrageenan in the form of an alkali metal or an ammonium salt, calcium-sensitive carrageenan in the form of an alkali metal or an ammonium salt in an amount equal to from about 30 to 155% by weight based on the weight of said potassium-sensitive carrageenan and a non-toxic water-soluble potassium salt other than potassium carrageenate in an amount equal to from about 10 to 110% by weight based on the weight of said potassium-sensitive carrageenan, said composition being free of polyvalent metal cations in amount more than about 0.01% by weight based on the combined weights of carrageenan or carrageenans present and said potassium salt.

5. A composition as set forth in claim 4 which also comprises a sweetening agent and a free organic acid to impart a tart flavor.

6. A composition as set forth in claim 4 wherein said potassium salt is potassium citrate.

7. A clear, elastic, water gel comprising water, potassium-sensitive carrageenan in the form of an alkali metal or an ammonium salt, and a non-toxic, water-soluble potassium salt other than potassium carrageenate in an amount equal to from about 10 to 110% by weight based on the weight of said potassium-sensitive carrageenan, said gel being free of polyvalent metal cations in amount more than about 0.01% by weight based on the combined weights of carrageenan or carrageenans present and said potassium salt.

8. A dessert gel as set forth in claim 7 which also comprises a sweetening agent and a free organic acid to impart a tart flavor.

9. A dessert gel as set forth in claim 7 wherein said potassium salt is potassium citrate.

10. A clear, elastic, non-weeping, water gel comprising water, potassium-sensitive carrageenan in the form of an alkali metal or an ammonium salt, calcium-sensitive carrageenan in the form of an alkali metal or an ammonium salt in an amount equal to from about 30 to 155% by weight based on the weight of said potassium-sensitive carrageenan, and a non-toxic, water-soluble potassium salt other than potassium carrageenate in an amount equal to from about 10 to 110% by weight based on the weight of said potassium-sensitive carrageenan, said gel geing free of polyvalent metal cations in amount more than about 0.01% by weight based on the combined weights of carrageenan or carrageenans present and said potassium salt.

11. A gel as set forth in claim 10 which also comprises a sweetening agent and a free organic acid to impart a tart flavor.

12. A gel as set forth in claim 10 wherein said potassium salt is potassium citrate.

* * * * *